March 4, 1941.    J. ULANO ET AL    2,234,064
ART OF SURFACE ORNAMENTATION
Filed July 26, 1939
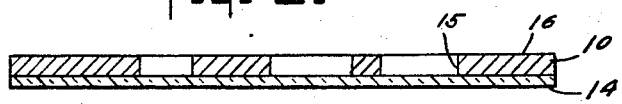
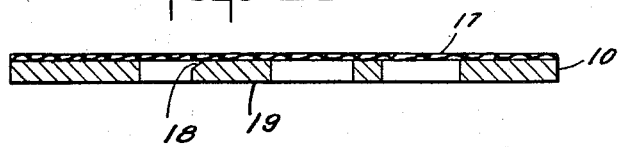
INVENTORS
Joseph Ulano
BY Harry Friedman
John P. Chandler
their ATTORNEY.

Patented Mar. 4, 1941

2,234,064

UNITED STATES PATENT OFFICE 2,234,064

ART OF SURFACE ORNAMENTATION

Joseph Ulano and Harry Friedman, Brooklyn, N. Y., assignors to Nu-Film Products Company, Inc., New York, N. Y., a corporation of New York Application July 26, 1939, Serial No. 286,520

5 Claims. (Cl. 41—38.6)

This invention relates to new and useful improvements in the art of surface ornamentation and relates more specifically to mechanical negatives for use in reproducing designs of one or more colors, and to the method of making such mechanical negatives.

The principal object of the invention is the provision of an improved method and material for preparing silk screens for use in printing designs by forcing colors therethrough. Under older practices, a design was traced upon a silk screen which was tightly mounted on a square or rectangular frame and a suitable impervious coating then applied to the portions of the silk outside said design, thus producing a negative through which colors were forced by use of a squeegee.

Another and more specific object of the present invention is the provision of an improved composite sheet or film of "resist" or blocking out material for use in making the negative, such blocking out material being impervious to the colors which are used in the printing operation, the sheet of material possessing a high order of strength in order that a large number of reproductions may be made from a single screen. In this regard, the material is particularly useful for screens used in hand printing of textiles wherein the dyestuffs or other coloring materials contain caustics and other ingredients which are especially harmful to screens.

Sheets of blocking out material for preparing mechanical negatives have been in commercial use for some time and in accordance with existing practices, portions corresponding to the design are removed from the sheet by the use of a suitable solvent or by manually cutting the design therefrom, and the remaining sheet then caused to adhere to the screen by the use of a hot iron or by means of a suitable solvent which renders the sheet tacky and capable of being adhesively secured to the screen.

The latter method of adhering the sheet of film constituting the mechanical negative to the screen has proven more effective than the former and it may be accomplished in less time than is required by employing the heat method. Nevertheless, the solvent adhering method has its great objections and limitations by virtue of the fact that the solvent attacks or "burns" the edges of the film, thus making a jagged line where a straight or smoothly curved line is desired, and accordingly ruining the screen for fine and artistic reproductions.

It is accordingly another object of the present invention to provide a sheet of material so formed as to be readily adhered to the screen by the use of a solvent but also being incapable of attack by the solvent along the printing edges thereof. To this end the invention comprises a homogeneous, unitary film or sheet of negative material composed of a plurality of superimposed layers, the several layers being mutually compatible one with the other but also having certain dissimilar characteristics in order that the sheet will function in the manner hereinafter described. The lower layer of the film, which may, if desired, be formed on a carrier sheet, is made from cellulosic material which is insoluble or relatively so in the solvent which is employed to cause the film to adhere to the screen. The second or top layer is made from material which is to a large extent soluble in the adhering solution. In order to make the complete film of a homogeneous character, however, two expedients are employed. First, a suitable amount of the material used in the second layer is incorporated in the material used for the first layer, and a somewhat larger percentage of the material used in layer one is incorporated in layer two. The second expedient is to employ materials in both layers which are entirely miscible with each other in any given proportion. By forming the layers of such materials it will be apparent that after the first layer is dry and the material forming the second layer is applied, such material will partially redissolve the first layer as such second layer is applied, thus forming, in effect, an intermediate layer comprising a mixture of the material used in both layers.

In the drawing:

Fig. 1 is a greatly enlarged section taken through a film constituting the present invention;

Fig. 2 is an enlarged section taken through a sheet of the film mounted on a carrier sheet, this view showing portions of the film removed;

Fig. 3 is a section taken through a completed screen with the film adhered thereto.

The film 10 shown in Fig. 1 comprises three layers 11, 12 and 13, respectively. The lower layer 11 desirably comprises a lacquer having a cellulose ester base, and more specifically it may be a cellulose nitrate lacquer. To the cellulose nitrate there is added suitable resins, gums and plasticizers, all dissolved in suitable solvents such as ethyl acetate or acetone. There is also added to this lacquer approximately ten percent of lacquer which is used to form the upper coat or layer 13. This latter material desirably has a cellulose ether base such as ethyl cellulose or benzyl cellulose, to which is added resins, plasticizers and solvents such as toluol, anhydrous ethyl alcohol, ethyl acetate, or combinations thereof. This material furthermore contains approximately 15% of the material used for the lower layer. If desired, a carrier sheet may also be employed, although this is not necessary for certain types of work. It is, however, useful in forming the film and may be removed thereafter. The lacquer comprising the first layer is desirably applied by means of a coating machine or it may be applied by means of spraying, brushing, or any other desired method. In the event that a relatively thick film is desired, two or even more coats of this first lacquer may be used to form the first layer of film. After the material comprising the first layer is dried by means of passing it through a drying oven or otherwise, the lacquer comprising the second layer is now applied in the same manner and it will be apparent that as this second layer is superimposed on the first, such first layer will be partly redissolved and there will accordingly be formed an intermediate layer designated as 12, which will consist of material used in forming layers 11 and 13. This intermediate layer 12 possesses its own specific characteristics, although it does not function to prevent a complete physical separation of layers 11 and 13, but rather forms an intimate bond between the two, thus forming a homogeneous unitary film.

The adhering liquid is of such character as to be a substantially complete solvent only for the upper layer 13 and for this purpose a solution containing an alcohol such as anhydrous ethyl alcohol, an ester such as ethyl acetate, a coal tar hydrocarbon such as toluol, and a petroleum hydrocarbon such as petroleum benzene. The ester should comprise not more than 5 to 10 percent by weight of the total solution and the balance of the ingredients may be in substantially equal proportions.

When the completed film is to be used in the preparation of a mechanical negative for a printing screen, portions of the film corresponding to the design are first removed by cutting or otherwise. The film 10 is illustrated in Fig. 2 as being mounted on a carrier sheet 14 and portions have been removed from the film, leaving open portions shown at 15. In the event that the particular design is such as to have center portions not physically attached to the balance of the sheet, it is best to mount the film upon the carrier sheet 14, although for many types of work this carrier sheet is not necessary. Once the film is cut, the upper surface thereof designated at 16 is placed in contact with a fine meshed fabric 17, such as silk, bolting cloth, wire mesh, or any other suitable material, and the adhering liquid then applied to this upper surface through the fabric. It will accordingly be apparent that the solvent or adhering liquid will immediately attack this upper layer and render the same tacky or adhesive, and cause the entire film to adhere to the screen.

It will be apparent that the adhering liquid so applied to the upper surface 16 of the film will partially dissolve or work up the lacquer comprising the upper layer 13 thereof, although such liquid will in no manner affect the lower layer 11 and, as to the printing edges of the prepared screen, will only slightly attack the intermediate layer 12.

The foregoing embodiment of the negative material is illustrative only and many changes and variations may be made therein without departing from the spirit of the invention. The materials forming the respective layers may also vary considerably, the essential thing in this regard being to form such film of superimposed layers of such materials as will form a firm bond between the several layers and at the same time to use materials for the several layers as will be incapable of attack by the same solvents, so that the solvent used for the adhering surface will have no substantial effect on the lower or contact surface of the film.

What we claim is:

1. A laminated material comprising a carrier sheet and a film layer carried thereby and adapted to form a mechanical negative when portions corresponding to a design to be reproduced are removed therefrom and the negative is secured to a foraminous printing screen, said carrier sheet being substantially transparent and being adhesively joined to but removable from the film layer, such layer comprising a homogeneous film formed from a plurality of superimposed layers of film-forming material, one of the layers having a cellulose ester base and the other layer having a cellulose ether base, whereby the upper surface of the film layer may be placed in engagement with a foraminous printing screen after said portions corresponding to the design have been removed, a solvent for the material constituting the upper layer then applied to such upper surface through the screen, and the film thus become joined to the screen without the possibility of the solvent attacking the lower layer, thus avoiding distortion of the edge of the printing stencil.

2. A laminated material comprising a backing sheet of substantially transparent paper or the like and a film layer carried thereby and adapted to form a mechanical negative when portions corresponding to a design to be reproduced are cut in outline and then removed therefrom and the negative is adhesively secured to a foraminous printing screen by the use of a solvent, said backing sheet being adhesively joined to but removable from the film layer, such layer comprising a homogeneous film formed from a plurality of superimposed layers of film-forming material, the lower layer having a cellulose ester base and the upper layer having a cellulose ether base, whereby a solvent for the cellulose ether used to adhere the upper layer to the foraminous screen will not attack the cellulose ester of the lower layer.

3. A laminated material comprising a carrier sheet and a substantially transparent film layer carried thereby and adapted to form a mechanical negative when portions corresponding to a design to be reproduced are removed therefrom and the negative is secured to a foraminous printing screen, said carrier sheet being substantially transparent and being adhesively joined to but removable from the film layer, such layer comprising a film formed from a plurality of superimposed layers of film-forming material firmly bonded together to form a homogeneous film, the lower layer having a nitrocellulose base and the upper layer having an ethyl cellulose base.

4. A laminated material comprising a carrier sheet and a film layer carried thereby and adapted to form a mechanical negative when portions corresponding to a design to be reproduced are removed therefrom and the negative is secured to a foraminous printing screen, said carrier sheet being substantially transparent and being adhesively joined to but removable from the film layer, such layer comprising a homogeneous film formed from a plurality of superimposed layers of film-forming material, the lower layer having a cellulose ester base and the upper layer having a cellulose ether base, and an intermediate layer formed from the material used for forming the upper and the lower layer.

5. A laminated material comprising a carrier sheet and a film layer carried thereby and adapted to form a mechanical negative when portions corresponding to a design to be reproduced are removed therefrom and the negative is secured to a foraminous printing screen, said carrier sheet being substantially transparent and being adhesively joined to but removable from the film layer, such layer comprising a homogeneous film formed from a plurality of superimposed layers of film-forming material, the lower layer having a cellulose ester base and the upper layer having a cellulose ether base, the upper layer and the lower layer each having incorporated therein a quantity of the material used in forming the lower and upper layers, respectively, in order that as the upper layer is applied to the lower layer the solvent in the former will slightly re-dissolve the latter, thus forming an intermediate layer comprising substantially equal portions of the material forming each layer.

JOSEPH ULANO.
HARRY FRIEDMAN.